(12) United States Patent
Kay et al.

(10) Patent No.: US 6,564,467 B1
(45) Date of Patent: May 20, 2003

(54) RAILWAY WHEEL MONITORING

(75) Inventors: Christopher James Kay, Derby (GB); Winston Gehan Rasaiah, Loughborough (GB); Alberto Villanueva-Leal, Derby (GB)

(73) Assignee: AEA Technology PLC, Didcot (GB)

( * ) Notice: Subject to any disclaimer, the term of this patent is extended or adjusted under 35 U.S.C. 154(b) by 0 days.

(21) Appl. No.: 10/031,595

(22) PCT Filed: Jul. 13, 2000

(86) PCT No.: PCT/GB00/02691
§ 371 (c)(1), (2), (4) Date: Feb. 11, 2002

(87) PCT Pub. No.: WO01/07308
PCT Pub. Date: Feb. 1, 2001

(30) Foreign Application Priority Data

Jul. 23, 1999 (GB) ............................................... 9917203

(51) Int. Cl.$^7$ .............................. G01B 5/20; B61K 9/12
(52) U.S. Cl. .............................. 33/651; 33/203; 33/1 Q; 246/169 R
(58) Field of Search ..................... 33/1 Q, 203, 203.15, 33/549, 550, 551, 552, 651, DIG. 13; 73/146, 865.8; 246/168.1, 169 R

(56) References Cited

U.S. PATENT DOCUMENTS

| | | | | |
|---|---|---|---|---|
| 340,883 A | * | 4/1886 | Kells | 33/651 |
| 725,411 A | * | 4/1903 | Compliment et al. | 33/651 |
| 2,442,491 A | * | 6/1948 | Gieskieng et al. | 246/169 R |
| 2,452,480 A | * | 10/1948 | Mason | 246/169 R |
| 2,574,474 A | * | 11/1951 | Gieskieng | 246/169 R |
| 3,333,097 A | * | 7/1967 | Jamison et al. | 246/169 R |
| 3,808,695 A | * | 5/1974 | LaMoreux | 33/203 |
| 3,844,513 A | * | 10/1974 | Bernhardson et al. | 246/169 R |
| 4,076,192 A | * | 2/1978 | Hoge | 246/247 |
| 4,324,048 A | * | 4/1982 | Frost | 33/651 |
| 5,577,690 A | * | 11/1996 | Haddox | 246/169 R |
| 6,003,232 A | * | 12/1999 | Lopez Gomez et al. | 33/203 |

FOREIGN PATENT DOCUMENTS

| | | | |
|---|---|---|---|
| DE | 1192230 | 5/1965 | |
| DE | 8713927.8 | 1/1988 | ............ G01M/17/00 |

OTHER PUBLICATIONS

Four–page partial English translation of German utility model (Gebrauchsmuster) 87 13 927.8, "Device for Obtaining Condition Data on Rolling Wheel Sets" (no date).

Two–page partial English translation of German patent DE 1 192 230, "Apparatus for Investinating and Measuring Flats in Rolling Railway Wheels." (no date).

* cited by examiner

Primary Examiner—G. Bradley Bennett
(74) Attorney, Agent, or Firm—William H. Holt

(57) ABSTRACT

During use, a wheel of a railway vehicle may become out of round, which will be detrimental to both the vehicle suspension and the railway track. The shape of such a wheel may be monitored to detect any such out of roundness, while the wheel is rolling, by measuring how far the flange of the wheel projects below the upper surface of the rail. This may be achieved by mounting a rigid bar (24) alongside the rail (10), the bar (24) being supported resiliently so as to be depressed by a flange of a wheel (40), and by measuring the vertical displacement of the bar. The bar (24) may be supported by a plurality of flat leaf springs (26), which are inclined to the horizontal at for example 30°. This ensures that the bar (24) remains substantially parallel to the top surface of the rail (10) when depressed by the flange of a wheel (40).

9 Claims, 2 Drawing Sheets

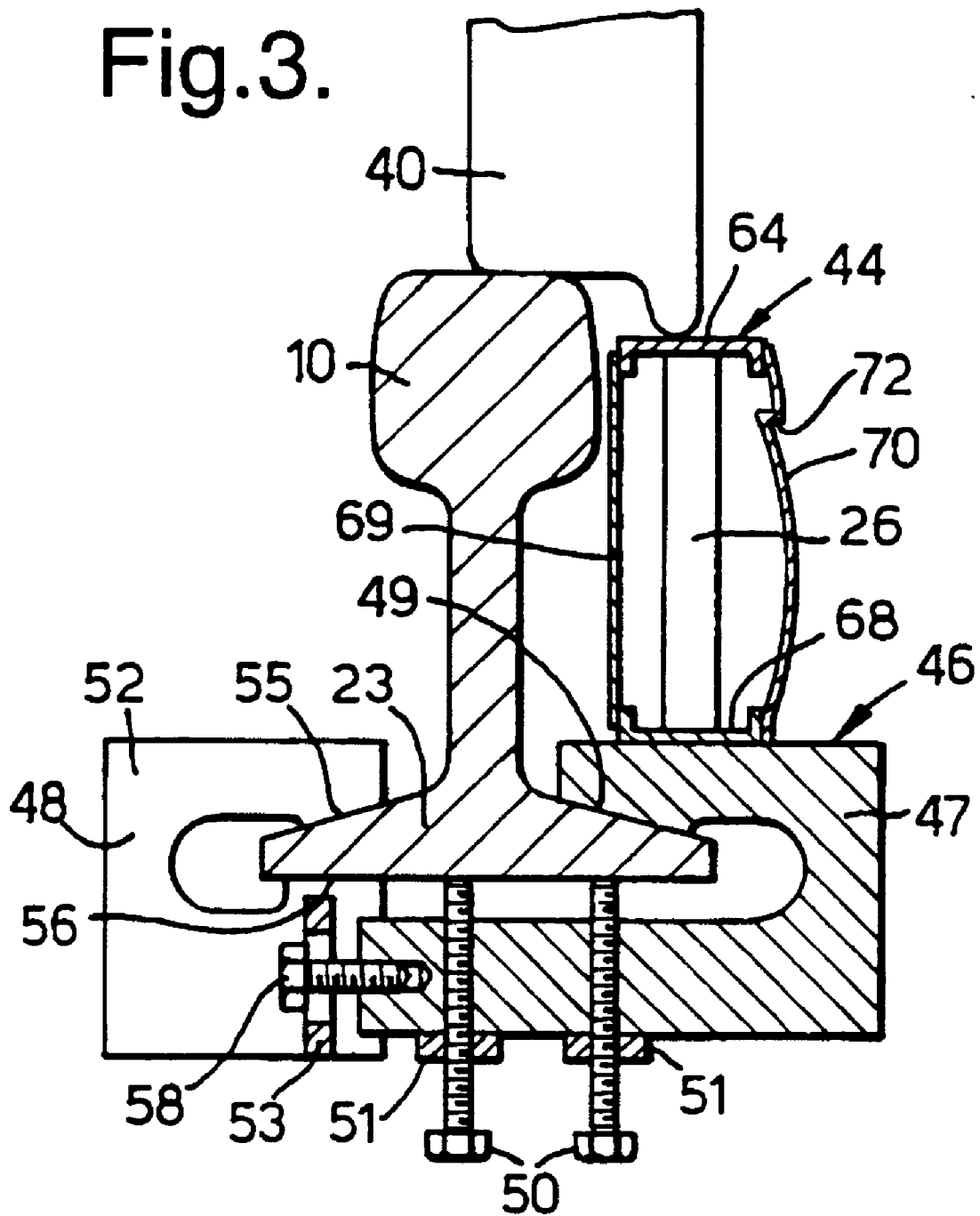

RAILWAY WHEEL MONITORING

This invention relates to a method and to an apparatus for monitoring if wheels of a railway vehicle are round.

As manufactured, a wheel of a railway vehicle can be expected to be accurately round, but through use the wheel tread may develop uneven radial deformations so it is out of round. This may arise if a part of the tread wears more rapidly than other parts of the tread as a result of defects or non-uniform materials, or it may arise as the result of skidding on the rails, causing a flat, or due to defects in the suspension. In any event such out of round wheels are responsible for increased forces on both the vehicle suspension and on the railway track, which may lead to damage to the suspension components, and to degradation of the track. They cannot easily be detected without removing each wheel from the track (for example during maintenance). A way of monitoring if wheels are round without taking vehicles out of service would therefore be useful, particularly in planning maintenance.

According to the present invention there is provided a method of monitoring the shape of a wheel of a railway vehicle, while the wheel is rolling along a rail of a railway track, by measuring how far the flange of the wheel projects below the upper surface of the rail.

It has been found that the perimeter of railway wheel flanges are accurately round, and that the shape of the flange is very rarely affected by those problems which cause the wheel tread to become out of round. Hence the flange can be used as a measurement datum.

In a second aspect, the present invention also provides apparatus for monitoring the shape of a wheel of a railway vehicle, while the wheel is rolling along a rail of a railway track, the apparatus comprising means for measuring how far the flange of the wheel projects below the upper surface of the rail.

Preferably the apparatus comprises a rigid bar, and means to support the bar alongside the rail, the bar being supported resiliently so as to be depressed by a flange of a wheel, the support means being clamped to the rail, and the apparatus also comprises means to measure the vertical displacement of the bar. This ensures that any movement of the track bed does not affect the measurement.

In a preferred embodiment the support means is arranged so that all parts of the bar are at the same height above the underside of the rail. The support means may comprise a plurality of flat leaf springs connected to the bar, the springs being parallel to each other and inclined to the horizontal at an angle preferably between about 25° and 40°, for example 30°. This ensures that the bar remains substantially parallel to its original position (and so to the top surface of the rail) when depressed, irrespective of the position along the bar at which the flange is in contact.

As the circumference of a wheel is typically greater than the wheelbase between successive wheels on a bogie of a vehicle it is desirable to provide a plurality of such bars alongside the rail. For example each bar might be of length about 0.7 m, the apparatus including for example five such bars.

The invention will now be further and more particularly described, by way of example only, and with reference to the accompanying drawings in which:

FIG. 3 shows a transverse sectional view of an alternative wheel monitor attached to a rail.

Figure 1:
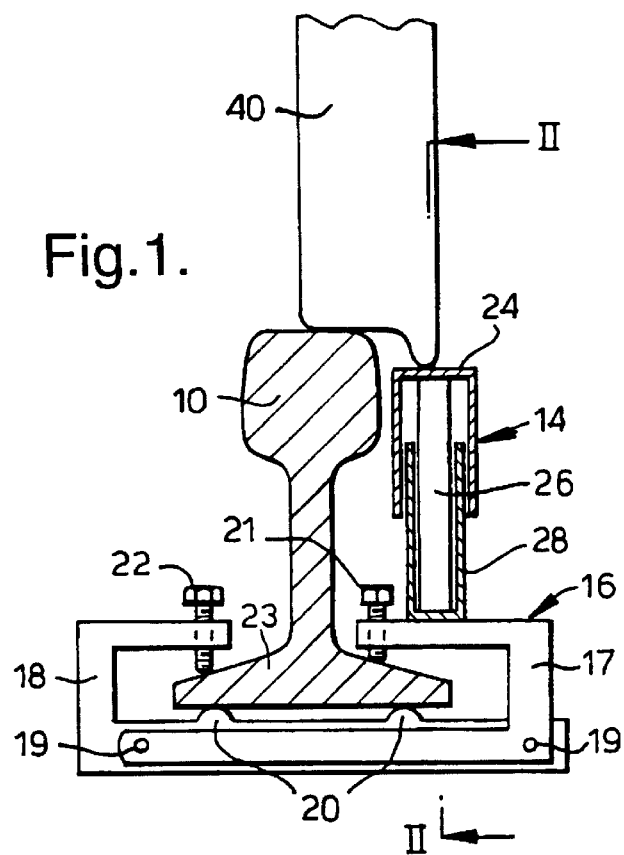
FIG. 1 shows a transverse sectional view of a wheel monitor attached to a rail.
Figure 2:
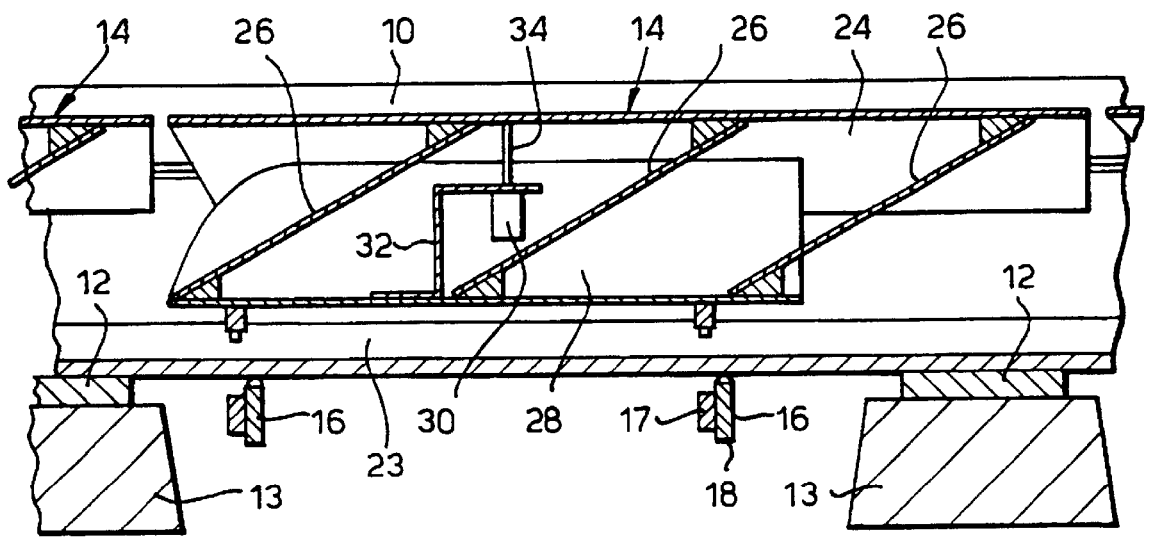
FIG. 2 shows a sectional view in the direction of the line II—II of FIG. 1.

Referring to FIGS. 1 and 2, a rail 10 is supported at intervals along its length by rail shoes 12 attached to sleepers 13. A wheel monitor 14 is attached alongside the rail 10 by two spaced-apart clamps 16. Each such clamp 16 consists of two generally C-shaped clamp bars 17 and 18, both of which extend under the rail 10, and which are fixed to each other by two bolts 19; the clamp bar 18 defines two protrusions 20 which abut the under surface of the rail 10, while bolts 21 and 22 through the upper ends of the clamp bars 17 and 18 push on the upper surface of the base flange 23 of the rail 10, so urging the protrusions 20 firmly against the under surface of the rail 10. The monitor 14 is attached to the clamp bar 17.

The monitor 14 consists of a rigid bar 24 of steel in the form of an upside down trough, of length 0.7 m. The bar 24 is supported by and fixed to three flat steel leaf springs 26 each inclined at 30° to the horizontal. The lower ends of these springs 26 are fixed to a support bar 28 of length 0.5 m which is fixed to the clamp bars 17, this bar 28 also being of steel in the form of a trough whose sides fit between the sides of the upper trough 24. The support bar 28 is short enough to fit between successive sleepers 13, and so does not obstruct the clips (not shown) which secure the rail 10 to the rail shoes 12. A linear transducer 30 is mounted on a bracket 32 fixed to the support bar 28, the transducer 30 including a push rod 34 which contacts the underside of the bar 24 at an intermediate position along its length.

If a wheel 40 rolls along the rail 10, as indicated in FIG. 1 the flange of the wheel 40 depresses the bar 24. The leaf springs 26 ensure that the bar 24 remains substantially parallel to the support bar 28 as the wheel 40 moves along the rail 10. Hence the signal generated by the transducer 30 indicates the distance that the flange has depressed the bar 24, and hence indicates how far the flange extends below the top surface of the rail 10. The signals from the transducer 30 are provided to a computer (not shown) which can hence determine if any wheel is out of round.

A practical wheel monitor should be able to obtain measurements about wheel shape over an entire circumference, which is typically about 3 m. Consequently it must consist of several such monitors 14 —for example five such monitors 14 would be clamped to the rail 10 end-to-end, with only a small gap (for example 5 mm) between one and the next. The ends of the side walls of the troughs (i.e. bars 24 and support bars 28) are shaped, as shown in FIG. 2, so that when one bar 24 is depressed it does not contact the adjacent bars 24. It is also desirable to provide a check rail (not shown) alongside the other rail of the track, to ensure no sideways movement of the wheel 40 can occur during measurement. Thus a practical wheel monitor consists of a section of railway track, for example that leading to a washer plant (where vehicles will be travelling slowly, at for example 8 km/h), with five monitors 14 mounted next to the right hand rail and a check rail alongside the left hand rail, followed by five monitors 14 mounted next to the left hand rail with a check rail alongside the right hand rail.

Such a wheel monitor can take measurements on wheels of different diameters, and with bogies with different wheel spacing (as long as the wheelbase is greater than 0.7 m). It will be appreciated that because the monitors 14 are mounted on the rail 10, any deflection of the track bed does not affect the measurements. The monitor 14 has been found capable of detecting deviations from roundness as small as 0.1 mm (under laboratory conditions). The monitor 14 is preferably calibrated, for example every six months, by rolling a wheel 40 which is known to be accurately round along the rail 10. The wheel monitor described above may be linked to a vehicle identification system, to provide totally automated monitoring of the wheels on all vehicles at a depot. Alternatively it may merely provide a warning signal to an operator if a wheel exceeds a threshold value of out of roundness, for example greater than 0.5 mm. This may be linked to an automated means, using for example a paint spray, to mark any such defective wheel. The monitor also enables checks to be made for any difference in diameter (due to uneven wear) between the two wheels on a single axle, even if both wheels remain round.

It will be appreciated that a wheel monitor may differ from that described above, while remaining within the scope of the present invention. For example, the means for clamping the monitor 14 to the rail 10 might differ from that described. The rigid bar 24 might be resiliently supported by a compression spring and guided by a parallelogram linkage, instead of the flat leaf springs 26. Alternatively the bar 24 might be resiliently supported by a pneumatic system—for example the bar 24 might rest on a resilient tube filled with pressurised liquid and connected to a pressurised gas reservoir. It will also be appreciated that the bar 24 should desirably be of wear-resistant material, or incorporate a strip of wear-resistant material along its upper surface. And the vertical displacement of the bar 24 might be measured by a different means, for example a non-contact optical sensor, or with a pair of strain gauges fixed to opposite surfaces of one of the leaf springs 26 to measure the bending (and to distinguish it from tension).

Referring now to FIG. 3 there is shown a transverse sectional view of an alternative wheel monitor 44 attached toga rail 10, those features which are identical to features in the monitor of FIGS. 1 and 2 being referred to by the same reference numerals. The monitor 44 is attached alongside the rail 10 by two spaced-apart clamps 46 (only one of which is shown), each clamp 46 consisting of two generally C-shaped clamping members 47 and 48, the monitor 44 being fixed to the members 47. One end of each clamping member 47 has an inclined clamping face 49 which abuts and matches the slope of the upper face of the base flange 23, whereas the other end extends under the rail 10, and two bolts 50 extend through threaded holes in the member 47 to push on the under surface of the rail 10, each bolt 50 being provided with a lock nut 51. By adjusting the bolts 50, the monitor 44 can be adjusted sideways relative to the rail 10.

Each clamping member 48 consists of two identical apertured plates 52, spaced apart in parallel planes (on either side of the plane in which the clamping member 47 lies) but joined by a yoke 53. The apertures in the plates 52 are shaped to define an inclined clamping face 55 which abuts and matches the slope of the upper face of the base flange 23, and to define a lower clamping face 56 which abuts the under surface of the rail 10. The clamping member 48 is secured to the clamping member 47 by a bolt 58 which passes through a slot in the yoke 53 and engages in a threaded hole in the member 47.

The monitor 44 consists of a rigid bar 64 of steel in the form of a shallow trough, of length 0.7 m. The bar 64 is supported by and fixed to three flat steel leaf springs 26 each inclined at 30° to the horizontal. The lower ends of these springs 26 are fixed to a support bar 68 of length 0.5 m which is fixed to the clamping members 47, this bar 68 also being of steel in the form of a shallow trough. As with the previously-described monitor 14, a sensor (not shown) is provided to monitor vertical displacements of the bar 64 when a wheel 40 passes along the rail 10.

The side of the monitor 44 nearer to the rail 10 is covered by a thin sheet 69 of flexible rubber connected to the bars 64 and 68, to protect the monitor 44 from dust, stones and rain. Along the other side of the monitor 44 is a thin sheet 70 of springy steel attached to the lower bar 68, the upper edge of the sheet 70 rubbing against the side of the upper bar 64, which also protects the monitor 44 from dust, stones and rain. The sheet 70 defines a step 72 along its whole length, about 12 mm below the bar 64 (in the absence of a wheel 40). The typical vertical displacement of the bar 64 when depressed by a wheel 40 is less than 10 mm, so that the step 72 does not affect normal operation of the monitor 44, but if a person unintentionally treads on the bar 64 then the step 72 will support his weight. Only if the load on the bar 64 exceeds say 200 kg will the sheet 70 deflect so the bar 64 can move lower.

What is claimed is:

1. An apparatus for monitoring the shape of a wheel of a railway vehicle to detect out-of-roundness, while the wheel is rolling along a rail of a railway track, the apparatus comprising at least one rigid bar, and means to support the bar resiliently alongside the rail, the support means comprising a plurality of flat leaf springs connected to the bar, the springs being parallel to each other and inclined to the horizontal such that the bar remains substantially parallel to its original position when depressed by a flange of a wheel as the wheel moves along the rail, the support means being clamped to the rail, and the apparatus also comprises means to measure the vertical displacement of the bar, and hence how far the flange of the wheel projects below the upper surface of the rail.

2. An apparatus as claimed in claim 1 in which the support means is arranged so that all parts of the bar are at the same height above the underside of the rail.

3. An apparatus as claimed in claim 1 in which the bar is of trough-shaped cross-section.

4. An apparatus as claimed in claim 1, in which the springs are inclined to the horizontal at an angle between about 25° and 40°.

5. An apparatus as claimed in claim 1 in which there are a plurality of such rigid bars arranged end to end alongside the rail.

6. An apparatus as claimed in claim 2 in which there are a plurality of such rigid bars arranged end to end alongside the rail.

7. An apparatus as claimed in claim 3 in which there are a plurality of such rigid bars arranged end to end alongside the rail.

8. An apparatus as claimed in claim 4 in which there are a plurality of such rigid bars arranged end to end alongside the rail.

9. A method of monitoring the shape of a wheel of a railway vehicle to detect out-of-roundness, while the wheel is rolling along a rail of a railway track, by measuring how far the flange of the wheel projects below the upper surface of the rail using an apparatus as claimed in claim 7.

* * * * *